W. BOSS.
GRASS CATCHER.
APPLICATION FILED SEPT. 14, 1912.

1,076,014.

Patented Oct. 21, 1913.

2 SHEETS—SHEET 1.

Witnesses:
Thos. Laggard
H. A. Bowman

Inventor:
William Boss.
By A. Whiteley
his Attorney.

W. BOSS.
GRASS CATCHER.
APPLICATION FILED SEPT. 14, 1912.

1,076,014.

Patented Oct. 21, 1913.
2 SHEETS—SHEET 2.

Witnesses:
Theo. Laggard
H. A. Bowman.

Inventor:
William Boss.
By F. U. Whiteley
his Attorney.

COLUMBIA PLANOGRAPH CO., WASHINGTON, D. C.

UNITED STATES PATENT OFFICE.

WILLIAM BOSS, OF ST. PAUL, MINNESOTA.

GRASS-CATCHER.

1,076,014.

Specification of Letters Patent.  Patented Oct. 21, 1913.

Application filed September 14, 1912.  Serial No. 720,333.

*To all whom it may concern:*

Be it known that I, WILLIAM BOSS, a citizen of the United States, residing at St. Paul, in the county of Ramsey and State of Minnesota, have invented certain new and useful Improvements in Grass-Catchers, of which the following is a specification.

My invention relates to grass catchers for use with lawn mowers.

It is the object of my invention to provide a grass catcher which may readily be attached to and detached from a lawn mower without the use of bolts or screws or any permanent attaching device secured to the lawn mower and which at the same time shall be held securely in position on the lawn mower while the same is being operated and will be particularly easy to remove when the same shall be filled with clippings for the purpose of emptying said clippings.

It is also an object of my invention to provide a grass catcher having the above characteristics which shall have means for holding the grass clippings therein without slipping when the lawn mower and attached grass catcher shall be brought to a sudden stop at the end of a mowing movement thereof.

The full objects and advantages of my invention will appear in connection with the detailed description thereof and are particularly pointed out in the claims.

Figure 1:
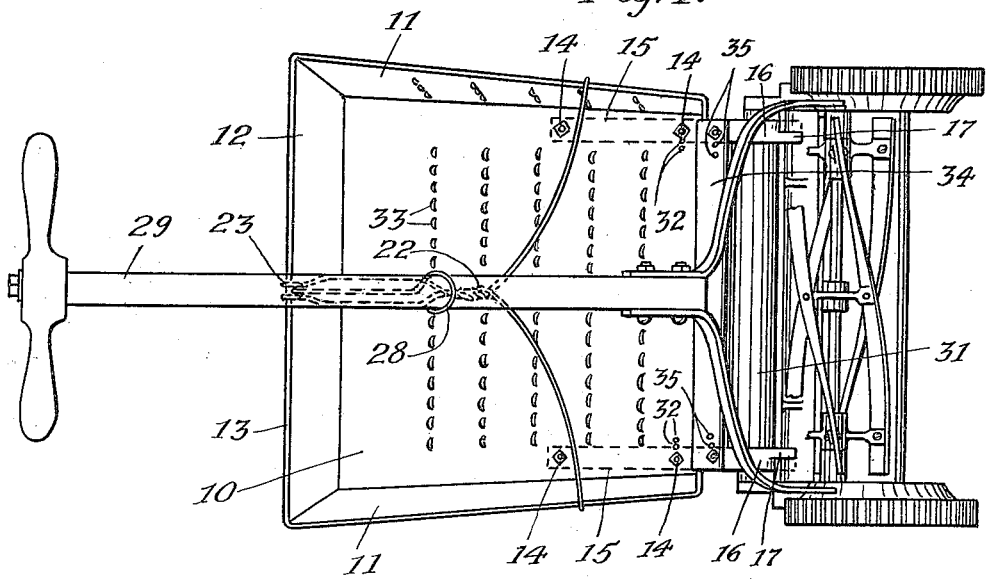
Figure 2:
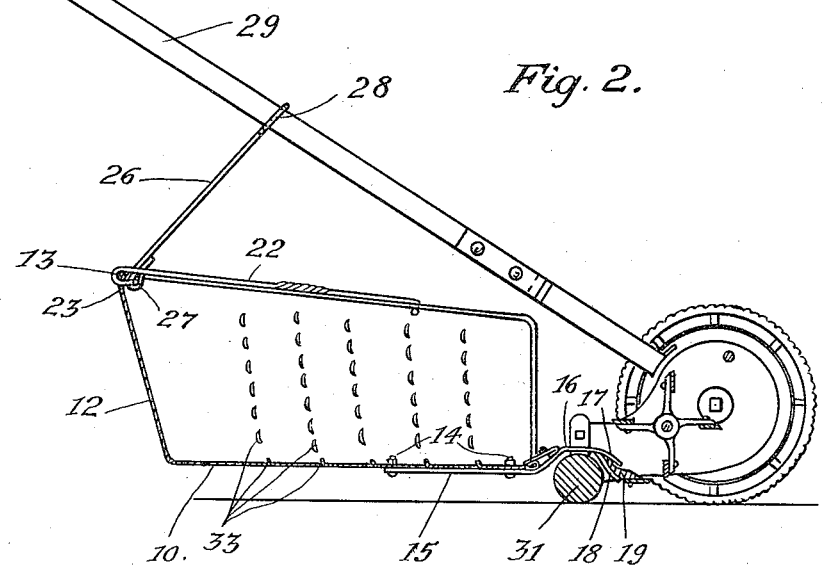
Figure 3:
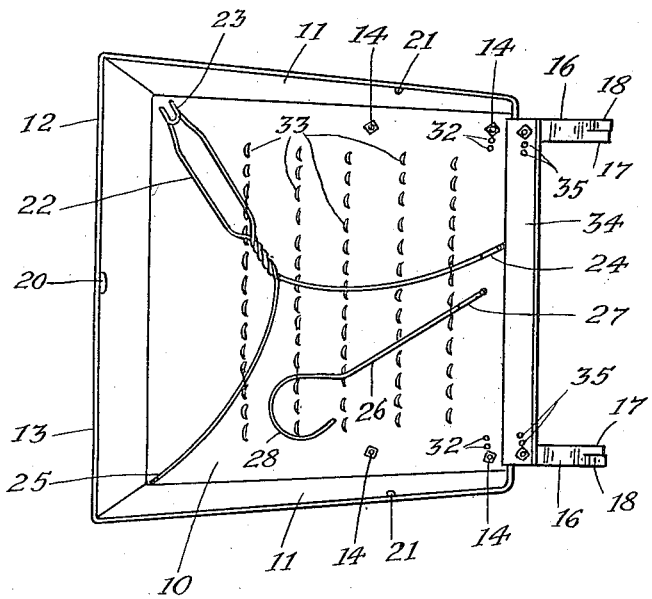
Figure 4:
Figure 6:
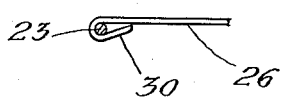
Figure 5:
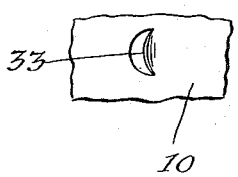
Figure 7:
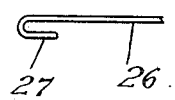

In the drawings, illustrating the application of my invention in one form, Figure 1 shows a plan view of a lawn mower having my improved grass catcher connected therewith. Fig. 2 is a side elevation taken in section of the parts shown in Fig. 1. Fig. 3 is a plan view of my improved grass catcher showing the manner in which the suspending means is detached from the body of the grass catcher and stored in the bottom thereof for nesting in shipping. Figs. 4 and 5 are detail views of the retarding means employed in my improved grass catcher. Figs. 6 and 7 are detail views showing how the supporting hook is assembled when the catcher is set up for working.

The body of the grass catcher comprises a bottom 10 and side walls 11 and a back wall 12, all of which may preferably be formed or stamped out of a single piece of sheet metal or similar material, a wire binding 13 of usual construction operating to stiffen the free edges of the end and side walls. To the bottom 10 is secured, by means of bolts 14 or otherwise, a pair of irons 15 which, as clearly shown in Fig. 2, are arched upwardly at 16, the end being turned downwardly again, as indicated at 17, and a portion 18 of said iron being split from the part 17 and further turned downwardly and forwardly to form a cleft such as will engage over and under the cutter bar holder 19 of the lawn mower when the grass catcher is in position for operation. The back wall 12 is provided with an aperture 20 and the side walls 11 with apertures 21 placed close to the wire binding 13. A twisted wire handle brace 22 has three arms each provided with a hook 23, 24 and 25, respectively, the entire handle brace being of such size that the same will fit in the bottom of the grass catcher when disassembled therefrom, as shown in Fig. 3. The hook 23 is formed of the loop end of the wire having two sides spaced apart and is adapted to be inserted from the outside through the elongated opening 20 in wall 12, while hooks 24 and 25 may be inserted through apertures 21 in side walls 11 from the outside thereof by springing said side walls inwardly for that purpose. A handle 26 is provided having at one end thereof a hook 27 which is adapted to be passed through the loop end of hook 23 between the two wires of member 22, after the member 22 has been assembled upon the grass catcher, as shown in Fig. 2. The handle 26 has a loop 28 upon the end away from hook 27 and turned at right angles to said hook 27 for engaging over the push bar 29 of the lawn mower, as shown in Figs. 1 and 2. The hook 27 may, as indicated in Fig. 7, be of considerable length so that after the same has been assembled upon the loop of hook 23 it may easily be bent up against the shank 26, as indicated at 30 in Fig. 6. All of the parts are thus readily detachable to be positioned for nesting the grass catcher for shipment, as indicated in Fig. 3.

In applying the grass catcher to a lawn mower it is simply necessary to slip forks on the irons 15 composed of the portions 17 and 18 over the upper edge of the cutter bar holder 19 and apply the loop 28 about the pusher bar 29, and when the bar 29 is raised into operative position the grass catcher will be held attached to the lawn mower, the angle of the holder 26 being such as constantly to push the forks formed of members 17, 18 against the cutter bar holder 19, while the arched portion 16 will pass over and span the roller 31 of the lawn mower. The bolts 14 securing the front portion of irons 15 to the bottom 10 may be secured through any one of a series of holes 32 in said bottom, by which means the spread of the forks composed of members 17 and 18 may be varied to adjust the grass catcher for attachment to lawn mowers of different widths.

In mowing a lawn, at the end of a given row the operator usually brings the machine to a stop somewhat abruptly, and often will need to push the machine back and forth in short strokes or reciprocations for the purpose of cutting out around shrubbery, walks, trees, etc. It is found in practice that the grass clippings in a grass catcher will tend to slide forward upon the bottom every time the lawn mower is brought to a stop, frequently piling up on the roller and blades so as to interfere with the efficiency of the work. To overcome this difficulty I provide a series of projections 33 in the bottom of my grass catcher, and if desired the same type of projections may be provided along the side walls. In view of the fact that the operator will frequently want to push the clippings in the grass catcher rearwardly to the back thereof, and also since the forward movement of the grass will most effectually be prevented by projections turned backwardly, the projections which I have provided will preferably be formed with a sloping front wall and be turned so as to point toward the back wall 12. Various methods may be employed for providing the desired projections. I find a very satisfactory form of projection, and one which is extremely efficient in use and at the same time can be conveniently and cheaply provided is that illustrated in Figs. 2, 4 and 5, in which the metal forming the bottom is punched up so as to lift a portion thereof breaking the same free from the body of metal at the back and having a series of small tongues extending cleanly from the bottom surface and turned backwardly toward the back wall. Such projections engage in the grass at the bottom of the grass catcher and hold the same from forward slipping. At the same time the production of rows of such projections actually has the effect of transversely stiffening the bottom of the grass catcher, and the projections cannot injure the hand of the operator under any normal conditions of use.

I provide a lip 34 at the front of the grass catcher which may be soldered to the front edge of the bottom 10 and will be supported by and secured to the upwardly sloping portion of the arch 16 of the irons 15 which will hold the lip 34 rigidly positioned at the front of the bottom of the grass catcher. A series of apertures 35 is provided in the lip 34 similar to apertures 32 in bottom 10 so that when the irons 15 are adjusted to fit the grass catcher for lawn mowers of different sizes such adjustment may also be made on the lip 34. It is obvious that in place of the series of apertures, as shown slots may be employed.

The advantageous features of my improved grass catcher will be apparent. No attaching means of any sort will need to be secured to the lawn mower. The grass catcher can be attached and detached with the utmost ease and yet will be supported accurately and without in any way interfering with the function of the lawn mower, the arch 16 of the irons 15 permitting the roller 31 to operate in all respects normally. The irons 15 will preferably be formed of malleable iron, in which case the bend of the arch 16 may be varied as desired to span rollers of different sizes, and the adjusting feature of the irons 15 will make it possible to use a single size of grass catcher on all ordinary sizes of lawn mowers having blades running from twelve to eighteen inches in length. The detachability of the handle brace 22 and holder 26 is a matter of material convenience in nesting these grass catchers for shipment since the walls 11 and 12 thereof are comparatively rigid structures. Furthermore, the provision of the projections 33 in the bottom 10, and also in the walls 11, if desired, gives an extremely effective means for preventing the forward slippage of grass clippings when the machine is brought to a sudden stop, as must be done very frequently in the course of mowing an ordinary lawn.

I claim:

1. A grass catcher comprising a receptacle for grass clippings, a pair of bars secured to the bottom of said receptacle and having cleft ends for freely engaging over and under the cutter bar holder of a lawn mower, said bars being provided with an upward and downward arch for carrying the same out of contact with the roller of the lawn mower, and a lip extended from the bottom of the receptacle and supported by the arched portion of said bars.

2. A grass catcher comprising a receptacle for grass clippings having a sheet metal bottom, and a series of members projecting upwardly from said bottom for preventing forward slippage of the grass clippings along said bottom when the lawn mower and receptacle is brought to a sudden stop.

3. A grass catcher comprising a receptacle for grass clippings having sheet metal bottom and side walls, and a series of members projecting upwardly from said bottom and inwardly from said walls for preventing forward slippage of the grass clippings within the receptacle when the lawn mower and receptacle is brought to a sudden stop.

4. A grass catcher comprising a receptacle for grass clippings having a sheet metal bottom, parts of said bottom being punched upwardly from below to form a series of rearwardly pointing upstanding members for preventing forward slippage of the grass clippings along said bottom when the lawn mower and receptacle is brought to a sudden stop.

5. A grass catcher comprising a receptacle for grass clippings having a sheet metal bottom, a pair of upwardly arched bars secured to said bottom and having cleft ends for freely engaging over and under the cutter bar holder of a lawn mower, a lip extended from the bottom of the receptacle and supported by the arched portion of said bars, and a series of rearwardly pointing upstanding members formed from the body of said bottom for preventing forward slippage of the grass clippings along said bottom when the lawn mower and receptacle is brought to a sudden stop.

In testimony whereof I affix my signature in presence of two witnesses.

WILLIAM BOSS.

Witnesses:
H. A. BOWMAN,
IRENE EMPENGER.

Copies of this patent may be obtained for five cents each, by addressing the "Commissioner of Patents, Washington, D. C."